United States Patent
Sethi et al.

(10) Patent No.: US 9,988,588 B2
(45) Date of Patent: *Jun. 5, 2018

(54) POST TORREFACTION BIOMASS PELLETIZATION

(71) Applicant: River Basin Energy, Inc., Highlands Ranch, CO (US)

(72) Inventors: Vijay Sethi, Laramie, WY (US); Clinton B. Camper, Billings, MT (US); Jerrod D. Isaak, Laramie, WY (US)

(73) Assignee: RIVER BASIN ENERGY, INC., Highlands Ranch, CO (US)

(*) Notice: Subject to any disclaimer, the term of this patent is extended or adjusted under 35 U.S.C. 154(b) by 0 days. days.

This patent is subject to a terminal disclaimer.

(21) Appl. No.: 14/740,041

(22) Filed: Jun. 15, 2015

(65) Prior Publication Data

US 2015/0275115 A1 Oct. 1, 2015

Related U.S. Application Data

(63) Continuation of application No. 13/665,886, filed on Oct. 31, 2012, now Pat. No. 9,057,037, which is a
(Continued)

(51) Int. Cl.
*C10L 5/00* (2006.01)
*C10L 5/44* (2006.01)
(Continued)

(52) U.S. Cl.
CPC .............. *C10L 5/447* (2013.01); *C10B 49/10* (2013.01); *C10B 53/02* (2013.01); *C10L 5/08* (2013.01);
(Continued)

(58) Field of Classification Search
CPC .. C10L 5/447; C10L 2290/20; C10L 2290/02; C10L 2290/06; C10L 2290/28;
(Continued)

(56) References Cited

U.S. PATENT DOCUMENTS 1,632,829 A 6/1927 Fleissner
1,960,917 A 5/1934 Nagelvoort et al.
(Continued)

FOREIGN PATENT DOCUMENTS

CA 959783 12/1974
DE 569941 2/1933
(Continued)

OTHER PUBLICATIONS

"A Survey of Biomass Gasification: Synopsis and Executive Summary," Solar Energy Research Institute, Jul. 1979, vol. 1, 38 pages.
(Continued)

*Primary Examiner* — Cephia D Toomer
(74) *Attorney, Agent, or Firm* — Lewis Brisbois Bisgaard & Smith LLP; Craig W. Mueller

(57) ABSTRACT

A process for torrefaction of biomass is provided in which biomass are passed into a fluidized bed or a non-fluidized bed reactor and heated to a predetermined temperature in an oxidizing environment. The dried biomass is then fed to a cooler where the temperature of the product is reduced to approximately 100 degrees Fahrenheit.

19 Claims, 6 Drawing Sheets

Related U.S. Application Data continuation-in-part of application No. 13/084,697, filed on Apr. 12, 2011, now Pat. No. 8,956,426, which is a continuation-in-part of application No. 12/763,355, filed on Apr. 20, 2010, now abandoned.

(60) Provisional application No. 61/555,856, filed on Nov. 4, 2011.

(51) Int. Cl.

| | | |
|---|---|---|
| *C10B 49/10* | (2006.01) | |
| *C10B 53/02* | (2006.01) | |
| *C10L 5/36* | (2006.01) | |
| *C10L 9/08* | (2006.01) | |
| *C10L 5/08* | (2006.01) | |
| *C10L 5/32* | (2006.01) | |

(52) U.S. Cl.
CPC ............... *C10L 5/32* (2013.01); *C10L 5/361* (2013.01); *C10L 5/363* (2013.01); *C10L 9/083* (2013.01); *C10L 2290/02* (2013.01); *C10L 2290/06* (2013.01); *C10L 2290/08* (2013.01); *C10L 2290/20* (2013.01); *C10L 2290/28* (2013.01); *C10L 2290/30* (2013.01); *C10L 2290/50* (2013.01); *C10L 2290/58* (2013.01); *Y02E 50/10* (2013.01); *Y02E 50/14* (2013.01); *Y02E 50/15* (2013.01); *Y02E 50/30* (2013.01); *Y02P 20/145* (2015.11)

(58) Field of Classification Search
CPC ............ C10L 2290/58; C10L 2290/08; C10L 2290/30; C10L 5/363; C10L 5/08; C10L 5/32; C10L 2290/60; C10L 5/3619; C10L 5/083; C10L 2290/50; C10L 5/361; C10L 9/083; C10B 49/10; C10B 53/02; Y02E 50/10; Y02E 50/14; Y02E 50/15; Y02E 50/30; Y02P 20/145
See application file for complete search history.

(56) References Cited

U.S. PATENT DOCUMENTS

| | | |
|---|---|---|
| 2,197,792 A | 4/1940 | Erickson |
| 2,204,781 A | 6/1940 | Wattles |
| 2,610,115 A | 9/1952 | Lykken |
| 2,763,478 A | 9/1956 | Parry |
| 2,811,427 A | 10/1957 | Lykken |
| 3,047,473 A | 7/1962 | Schmidt |
| 3,424,573 A | 1/1969 | Catogio de Villiers |
| 3,687,431 A | 8/1972 | Parks |
| 3,723,079 A | 3/1973 | Seitzer |
| 3,896,557 A | 7/1975 | Seitzer et al. |
| 3,961,914 A | 6/1976 | Kindig et al. |
| 3,971,639 A | 7/1976 | Matthews |
| 3,977,947 A | 8/1976 | Pyle |
| 3,985,516 A | 10/1976 | Johnson et al. |
| 3,985,517 A | 10/1976 | Johnson et al. |
| 3,997,422 A | 12/1976 | Bull et al. |
| 4,043,763 A | 8/1977 | Norman et al. |
| 4,045,187 A | 8/1977 | Brink et al. |
| 4,052,169 A | 10/1977 | Cole et al. |
| 4,071,151 A | 1/1978 | Farber |
| 4,104,035 A | 8/1978 | Cole et al. |
| 4,140,228 A | 2/1979 | Hathaway et al. |
| 4,142,868 A | 3/1979 | Genesoy et al. |
| 4,145,256 A | 3/1979 | Bowen |
| 4,149,228 A | 4/1979 | Adamson, Jr. |
| 4,170,456 A | 10/1979 | Smith |
| 4,192,650 A | 3/1980 | Seitzer |
| 4,203,727 A | 5/1980 | Simpson |
| 4,211,740 A | 7/1980 | Dean et al. |
| 4,213,752 A | 7/1980 | Seitzer |
| 4,214,875 A | 7/1980 | Kromrey |
| 4,226,371 A | 10/1980 | Willams |
| 4,244,530 A | 1/1981 | Halvorsen |
| 4,249,909 A | 2/1981 | Comolli |
| 4,282,006 A | 8/1981 | Funk |
| 4,300,291 A | 11/1981 | Heard et al. |
| 4,301,746 A | 11/1981 | Pech et al. |
| 4,308,033 A | 12/1981 | Gunnerman |
| 4,309,192 A | 1/1982 | Kubo et al. |
| 4,314,898 A | 2/1982 | Nakako et al. |
| 4,324,544 A | 4/1982 | Blake et al. |
| 4,329,929 A | 5/1982 | Jessen |
| 4,341,530 A | 7/1982 | Loth et al. |
| 4,353,427 A | 10/1982 | Stock et al. |
| 4,396,394 A | 8/1983 | Li et al. |
| 4,430,963 A | 2/1984 | Finet |
| 4,444,129 A | 4/1984 | Ladt |
| 4,452,688 A | 6/1984 | Mitchell et al. |
| 4,455,148 A | 6/1984 | Nagata et al. |
| 4,461,624 A | 7/1984 | Wong |
| 4,468,232 A | 8/1984 | Funk |
| 4,470,878 A | 9/1984 | Petrovic et al. |
| 4,486,894 A | 12/1984 | Page et al. |
| 4,495,710 A | 1/1985 | Ottoson |
| 4,497,122 A | 2/1985 | Nelson et al. |
| 4,504,277 A | 3/1985 | Scheffee |
| 4,510,040 A | 4/1985 | Skinner et al. |
| 4,511,363 A | 4/1985 | Nakamura et al. |
| 4,519,995 A | 5/1985 | Schrofelbauer et al. |
| 4,529,407 A | 7/1985 | Johnston et al. |
| 4,547,282 A | 10/1985 | Schindler |
| 4,553,978 A | 11/1985 | Yvan |
| 4,562,748 A | 1/1986 | Mrochek et al. |
| 4,563,196 A | 1/1986 | Seipenbusch |
| 4,571,174 A | 2/1986 | Shelton |
| 4,575,418 A | 3/1986 | Robbins |
| 4,596,650 A | 6/1986 | Schindler et al. |
| 4,606,793 A | 8/1986 | Petrovic et al. |
| 4,617,744 A | 10/1986 | Siddoway et al. |
| 4,787,917 A | 11/1988 | Leclerc de Bussy |
| 4,795,037 A | 1/1989 | Rich, Jr. |
| 4,816,572 A | 3/1989 | Bourgeois |
| 4,852,384 A | 8/1989 | Woolbert et al. |
| 4,954,620 A | 9/1990 | Bourgeois |
| 5,003,891 A | 4/1991 | Kaneko et al. |
| 5,030,054 A | 7/1991 | Reschly et al. |
| 5,033,208 A | 7/1991 | Ohno et al. |
| 5,035,721 A | 7/1991 | Atherton |
| 5,050,310 A | 9/1991 | Jiles |
| 5,054,697 A | 10/1991 | Provost |
| 5,087,269 A | 2/1992 | Cha et al. |
| 5,103,743 A | 4/1992 | Berg |
| 5,145,489 A | 9/1992 | Dunlop |
| 5,156,686 A | 10/1992 | Van Slyke |
| 5,171,474 A | 12/1992 | Tono |
| 5,174,799 A | 12/1992 | Garcia-Mallol |
| 5,197,398 A | 3/1993 | Levy et al. |
| 5,199,185 A | 4/1993 | Davidson |
| 5,213,635 A | 5/1993 | Huang |
| 5,215,596 A | 6/1993 | Van Slyke |
| 5,234,577 A | 8/1993 | Van Slyke |
| 5,265,774 A | 11/1993 | Stone |
| 5,269,947 A | 12/1993 | Baskis |
| 5,322,530 A | 6/1994 | Merriam et al. |
| 5,327,717 A | 7/1994 | Huak |
| 5,360,553 A | 11/1994 | Baskis |
| 5,361,513 A | 11/1994 | Woessner |
| 5,387,267 A | 2/1995 | Warf et al. |
| 5,396,260 A | 3/1995 | Adel et al. |
| 5,411,560 A | 5/1995 | Mainwaring et al. |
| 5,442,919 A | 8/1995 | Wilhelm |
| 5,444,733 A | 8/1995 | Coassin et al. |
| 5,462,932 A | 10/1995 | Brenner et al. |
| 5,471,955 A | 12/1995 | Dietz |
| 5,477,850 A | 12/1995 | Zegler et al. |
| 5,503,646 A | 4/1996 | McKenny et al. |
| 5,517,930 A | 5/1996 | Farwick et al. |
| 5,521,132 A | 5/1996 | Talmy et al. |
| 5,527,365 A | 6/1996 | Coleman et al. |

(56) References Cited

U.S. PATENT DOCUMENTS

| | | | |
|---|---|---|---|
| 5,534,127 A | 7/1996 | Sakai | |
| 5,534,137 A | 7/1996 | Griggs et al. | |
| 5,537,941 A | 7/1996 | Goidich | |
| 5,543,061 A | 8/1996 | Baskis | |
| 5,546,875 A | 8/1996 | Selle et al. | |
| 5,547,549 A | 8/1996 | Fraas | |
| 5,556,436 A | 9/1996 | Yagaki et al. | |
| 5,562,884 A | 10/1996 | Oakes et al. | |
| 5,568,896 A | 10/1996 | Adams et al. | |
| 5,587,085 A | 12/1996 | Yoon et al. | |
| 5,601,692 A | 2/1997 | Rinker et al. | |
| 5,612,003 A | 3/1997 | Heumann | |
| 5,625,119 A | 4/1997 | Tischler | |
| 5,637,336 A | 6/1997 | Kannenberg et al. | |
| 5,695,532 A | 12/1997 | Johnson et al. | |
| 5,730,775 A | 3/1998 | Meissner et al. | |
| 5,830,246 A | 11/1998 | Dunlop | |
| 5,830,247 A | 11/1998 | Dunlop | |
| 5,832,848 A | 11/1998 | Reynoldson et al. | |
| 5,858,035 A | 1/1999 | Dunlop | |
| 5,904,741 A | 5/1999 | Dunlop et al. | |
| 6,068,671 A | 5/2000 | Iijima et al. | |
| 6,146,432 A | 11/2000 | Ochs et al. | |
| 6,162,265 A | 12/2000 | Dunlop et al. | |
| 6,447,559 B1 | 9/2002 | Hunt | |
| 7,537,622 B2 | 5/2009 | Dunlop et al. | |
| 7,695,535 B2 | 4/2010 | Dunlop | |
| 7,893,307 B2 | 2/2011 | Smith | |
| 7,942,942 B2 | 5/2011 | Paoluccio | |
| 8,062,410 B2 | 11/2011 | Bullinger et al. | |
| 8,197,561 B2 | 6/2012 | Dunlop et al. | |
| 8,203,024 B2 | 6/2012 | Leonhardt | |
| 8,956,426 B2 * | 2/2015 | Sethi | C10B 49/10 44/550 |
| 9,057,037 B2 * | 6/2015 | Camper | C10B 49/10 |
| 2003/0221363 A1 * | 12/2003 | Reed | C10L 5/361 44/594 |
| 2008/0190015 A1 | 8/2008 | Davidsson | |
| 2008/0223269 A1 | 9/2008 | Paoluccio | |
| 2009/0007484 A1 | 1/2009 | Smith | |
| 2009/0084029 A1 | 4/2009 | Bergman | |
| 2009/0205546 A1 | 8/2009 | Kluko | |
| 2009/0250331 A1 | 10/2009 | Hopkins et al. | |
| 2009/0272027 A1 | 11/2009 | Ruiters | |
| 2010/0206499 A1 | 8/2010 | Lasonde et al. | |
| 2010/0273899 A1 | 10/2010 | Winter | |
| 2011/0094150 A1 | 4/2011 | Hunt | |
| 2011/0252698 A1 | 10/2011 | Camper et al. | |
| 2011/0314728 A1 | 12/2011 | Camper et al. | |
| 2012/0272569 A1 | 11/2012 | Dunlop et al. | |
| 2015/0159105 A1 | 6/2015 | Sethi et al. | |

FOREIGN PATENT DOCUMENTS

| | | |
|---|---|---|
| DE | 102005038135 | 3/2007 |
| GB | 2448531 | 10/2008 |
| WO | WO 81/01713 | 6/1981 |
| WO | WO 00/66683 | 11/2000 |
| WO | WO 2006/006863 | 1/2006 |
| WO | WO 2007/078199 | 7/2007 |
| WO | WO 2010/093310 | 8/2010 |
| WO | WO 2011/062488 | 5/2011 |
| WO | WO 2012/167796 | 12/2012 |

OTHER PUBLICATIONS

"A Survey of Biomass Gasification: Current Technology and Research," Solar Energy Research Institute, Apr. 1980, vol. 3, 308 pages.
"Tech-info" BMA, May 2011, 12 pages.
"Torrefaction," Wikipedia, the free encyclopedia, Oct. 1, 2011, [retrieved on Dec. 18, 2012], 3 pages. Retrieved from: http://en.wikipedia.org/w/index.php?title=Torrefaction&oldid=453436887.
Amos Report on Biomass Drying Technology, National Renewable Energy Laboratory, Nov. 1998, 35 pages.
Bergman et al. "Torrefaction for biomass co-firing in existing coal-fired power stations," Biocoal, ECN-C-05-013, Jul. 2005, 71 pages.
Kaliyan, et al., "Densification characteristics of corn cobs," Department of Bioproducts and Biosystems Engineering, University of Minnesota, date unknown, 31 pages.
Kaliyan, et al., "Natural binders and solid bridge type binding mechanisms in briquettes and pellets made from corn stover and switchgrass," Bioresource Technology, 2010, vol. 101, pp. 1082-1090.
Milne et al. "Biomass Gasifier "Tars": Their Nature, Formation, and Conversion," National Renewable Energy Laboratory, Nov. 1998, 28 pages.
Prins et al., "More efficient biomass gasification via torrefaction," Energy, 2006, vol. 31, pp. 3458-3470.
Shafizadeh, Introduction to Pyrolysis of Biomass, Journal of Analytical and Applied Pyrolysis, Apr. 1982, vol. 3, No. 4, pp. 283-305.
Shaw, "Feedstock and Process Variables Influencing Biomass Densification," Master of Science Thesis, Department of Agricultural and Bioresource Engineering, University of Saskatchewan, 2008, 159 pages.
Stelte, et al., "Fuel pellets from biomass: The importance of the pelletizing pressure and its dependency on the processing conditions," Fuel—The Science and Technology of Fuel and Energy, 2011, vol. 90, Iss. 11, pp. 3285-3290.
Wilén et al., "Wood torrefaction—market prospects and integration with the forest and energy industry," VTT Technology 163, 2014, 61 pages.
International Search Report for International (PCT) Application No. PCT/US10/49957, dated Nov. 17, 2010.
Written Opinion for International (PCT) Application No. PCT/US10/49957, dated Nov. 17, 2010.
International Preliminary Report on Patentability for International (PCT) Patent Application No. PCT/US2010/049957, dated Apr. 5, 2012 9 pages.
Official Action for Australia Patent Application No. 2010298284, dated Sep. 18, 2015 2 pages.
Extended European Search Report for European Patent Application No. 10819441.6 dated Jul. 24, 2013, 11 pages.
Official Action and Search Report for European Application No. 11003257.0, dated Feb. 2, 2012, 8 pages.
Official Action for European Application No. 11003257.0, dated Apr. 21, 2015, 5 pages.
Extended European Search Report for European Patent Application No. 12007517.1 dated Jan. 14, 2013, 8 pages.
Official Action for European Patent Application No. 12007517.1, dated Sep. 4, 2015 5 pages.
Notice of Allowance for U.S. Appl. No. 11/316,508, dated Jan. 27, 2010.
Official Action for U.S. Appl. No. 12/566,174, dated Oct. 27, 2011, 13 pages.
Notice of Allowance for U.S. Appl. No. 12/566,174, dated Mar. 8, 2012, 7 pages.
Official Action for U.S. Appl. No. 13/492,227, dated Jul. 22, 2015 13 pages.
Official Action for U.S. Appl. No. 12/763,355, dated Sep. 6, 2012 9 pages.
Official Action for U.S. Appl. No. 12/763,355, dated Dec. 26, 2012 11 pages.
Official Action for U.S. Appl. No. 13/084,697, dated Mar. 20, 2013 15 pages.
Official Action for U.S. Appl. No. 13/084,697, dated Dec. 6, 2013 15 pages.
Official Action for U.S. Appl. No. 13/084,697 dated May 9, 2014, 9 pages.
Notice of Allowance for U.S. Appl. No. 13/084,697 dated Oct. 1, 2014, 8 pages.
Official Action for U.S. Appl. No. 12/822,863 dated Jun. 7, 2013, 5 pages.
Official Action for U.S. Appl. No. 12/822,863 dated Nov. 20, 2013, 10 pages.

(56) References Cited

OTHER PUBLICATIONS

Official Action for U.S. Appl. No. 12/822,863 dated Jun. 19, 2014, 14 pages.
Final Action for U.S. Appl. No. 12/822,863 dated Jan. 16, 2015, 14 pages.
Official Action for U.S. Appl. No. 12/822,863, dated Oct. 2, 2015 12 pages.
Official Action for U.S. Appl. No. 13/665,886, dated Aug. 28, 2014, 8 pages.
Notice of Allowance for U.S. Appl. No. 13/665,886, dated Feb. 11, 2015, 5 pages.
Stelte et al., "Pelletizing properties of torrefied spuce," Biomass and Bioenergy, 2011, vol. 35(11), pp. 4690-4698.
Wu et al., "Study on Energy Saving of Chinese-fir Wood Carbonization Process Based on Moisture Absorption Characteristics," IEEE; 2009, 4 pages.
Official Action for Canadian Patent Application No. 2780314, dated Jun. 29, 2016 3 pages.
Official Action for European Patent Application No. 12007517.1, dated Feb. 1, 2017 9 pages.
Extended European Search Report for European Patent Application No. 16020492.1 dated Mar. 7, 2017, 10 pages.
Extended European Search Report for European Patent Application No. 16020495.1 dated Mar. 17, 2017, 14 pages.
Final Action for U.S. Appl. No. 13/492,227, dated Jan. 6, 2016 14 pages.
Official Action for U.S. Appl. No. 13/492,227, dated Sep. 23, 2016 14 pages.
Final Action for U.S. Appl. No. 13/492,227, dated Apr. 19, 2017 15 pages.
Official Action for U.S. Appl. No. 14/623,793 dated Jan. 17, 2017 8 pages.
Final Action for U.S. Appl. No. 12/822,863, dated May 20, 2016 16 pages.
Advisory Action for U.S. Appl. No. 12/822,863, dated Aug. 30, 2016 3 pages.
Official Action for U.S. Appl. No. 12/822,863, dated Mar. 8, 2017 10 pages.
U.S. Appl. No. 10/978,768, filed Nov. 1, 2004 now U.S. Pat. No. 7,537,622.
U.S. Appl. No. 11/316,508, filed Dec. 22, 2005 now U.S. Pat. No. 7,695,535.
U.S. Appl. No. 12/566,174, filed Sep. 24, 2009 now U.S. Pat. No. 8.197,561.
U.S. Appl. No. 13/492,227, filed Jun. 8, 2012.
U.S. Appl. No. 08/811,127, filed Mar. 3, 1997 now U.S. Pat. No. 5,830,246.
U.S. Appl. No. 08/928,858, filed Sep. 12, 1997 now U.S. Pat. No. 5,830,247.
U.S. Appl. No. 09/170,576, filed Oct. 13, 1998 now U.S. Pat. No. 5,904,741.
U.S. Appl. No. 09/313,338, filed May 17, 1999 now U.S. Pat. No. 6,162,265.
U.S. Appl. No. 08/928,828, filed Sep. 12, 1997 now U.S. Pat. No. 5,858,035.
U.S. Appl. No. 12/763,355, filed Apr. 20, 2010.
U.S. Appl. No. 13/084,697, filed Apr. 12, 2011 now U.S. Pat. No. 8,956,426.
U.S. Appl. No. 14/623,793, filed Feb. 17, 2015.
U.S. Appl. No. 12/822,863, filed Jun. 24, 2010.
U.S. Appl. No. 13/665,886, filed Oct. 31, 2012 now U.S. Pat. No. 9,057,037.

\* cited by examiner

| PROXIMATE ANALYSIS METHOD: ASTM D-5142 | AS RECEIVED Wt% | MOISTURE FREE wt% | MAF BASIS wt% |
|---|---|---|---|
| MOISTURE | 35.4 | | |
| ASH | 1.61 | 2.5 | |
| VOLATILE MATTER | 48.73 | 75.44 | 77.37 |
| FIXED CARBON | 14.26 | 22.06 | 22.63 |
| TOTAL | 100 | 100 | 100 |

| ULTIMATE ANALYSIS METHOD: ASTM 5142/5373 | | | |
|---|---|---|---|
| MOISTURE | 35.4 | | |
| HYDROGEN | 3.55 | 5.49 | |
| CARBON | 32.71 | 50.64 | |
| MNITROGEN | 0.04 | 0.07 | |
| SULFUR | 0.12 | 0.19 | |
| OXYGEN | 26.57 | 41.11 | |
| ASH | 1.61 | 2.5 | |
| TOTAL | 100 | 100 | |

| HEATING VALUE, BTU/lB: METHOD:ASTM D5865 | 5,699 | 8,823 | 9,049 |
|---|---|---|---|

FIG.4

| PROXIMATE ANALYSIS METHOD: ASTM D-5142 | AS RECEIVED Wt% | MOISTURE FREE wt% | MAF BASIS wt% |
|---|---|---|---|
| MOISTURE | 1.71 | ***** | ***** |
| ASH | 0.48 | 0.49 | ***** |
| VOLATILE MATTER | 67.03 | 68.2 | 68.53 |
| FIXED CARBON | 30.78 | 31.31 | 31.47 |
| TOTAL | 100 | 100 | 100 |

| ULTIMATE ANALYSIS METHOD: ASTM 5142/5373 | | | |
|---|---|---|---|
| MOISTURE | 1.71 | | |
| HYDROGEN | 5.46 | 5.56 | |
| CARBON | 54.43 | 55.38 | |
| MNITROGEN | 0.03 | 0.03 | |
| SULFUR | 0.29 | 0.3 | |
| OXYGEN | 37.6 | 38.24 | |
| ASH | 0.48 | 0.49 | |
| TOTAL | 100 | 100 | |

| HEATING VALUE, BTU/LB: METHOD:ASTM D5865 | 8,967 | 9,123 | 9,168 |

FIG.5

POST TORREFACTION BIOMASS PELLETIZATION

This application is a continuation of U.S. patent application Ser. No. 13/665,886, ("the '886 Application") filed on Oct. 31, 2012, which claimed the benefit of U.S. Provisional Application Ser. No. 61/555,856, filed Nov. 4, 2011, the entire disclosures of which are incorporated by reference herein. The '886 Application is also a continuation-in-part of U.S. patent application Ser. No. 13/084,697, filed Apr. 12, 2011, which issued as U.S. Pat. No. 8,956,426 on Feb. 17, 2015, which is a Continuation In Part of U.S. patent application Ser. No. 12/763,355, filed Apr. 20, 2010, the entire disclosure of each is incorporated by reference herein.

FIELD OF THE INVENTION

Embodiments of the present invention generally relate to thermal processing of biomass "torrefaction" so that it can be used instead of, or in addition to, fossil fuels for energy production thereby reducing the carbon footprint. In one embodiment of the present invention, the biomass is "roasted" in the presence of oxygen wherein heat generated by the combustion of biomass and hot gases associated with biomass combustion provide the heat required to support the torrefaction/roasting process, all in a single reactor.

BACKGROUND OF THE INVENTION

Many states have adopted Renewable Portfolio Standards (RPS) that require electricity supply companies to increase energy production that is attributed to renewable energy sources. The federal government may soon implement a renewable electricity standard (RES) that would be similar to the "renewables obligation" imposed in the United Kingdom. These standards place an obligation on electricity supply companies to produce a specified fraction of their electricity from renewable energy sources, such as wind, solar, hydroelectric, geothermal, biofuels, and biomass.

"Biomass" refers to renewable organic materials such as wood, forestry waste, energy crops, municipal waste, plant materials, or agricultural waste. Biomass often contains about 10 to about 50 weight percent moisture and up to about 50 weight percent oxygen. The moisture and oxygen content in raw biomass decreases its fuel value and increases costs associated with transportation of the biomass. Thus biomass is a low grade, high cost fuel that cannot compete economically with fossil fuels most commonly used to generate electricity. Further, biomass has a low bulk density, is very hydrophilic, can be seasonal, is variable, and has a limited shelf life.

"Torrefaction" refers to the processing of biomass at temperatures between about 200° C. to about 350° C. (400°-660° F.) at atmospheric pressure wherein water and light volatile organic chemicals associated with the raw biomass material (i.e., "feed stock") are vaporized. In addition, during the torrefaction process, molecules of biopolymers (hemicelluloses and some lignin) contained in the biomass decompose. After torrefaction, the biomass is a solid, dry, blackened material that is often referred to as "torrefied biomass" or "biocoal" that is easier to grind than raw unprocessed biomass and has a heating value comparable to low-rank coals, which allows it to be used in coal burning power plants without any major equipment modifications or plant capacity derate. Further, the torrefied biomass has a significantly, reduced moisture content, and has higher fixed carbon levels.

Fluid bed reactors are commonly used to carry out multiphase reactions. In this type of reactor, gas or liquid is passed through a granular solid material at high enough velocity to suspend the solid and cause it to behave as though it were a fluid. This process, known as "fluidization" imparts many important advantages to the reactor. As a result, the fluidized bed reactor is now used in many industrial applications, such as coal drying. Commonly coal drying is performed in an inert gas, i.e., oxygen-free environment. Drying coal in a non-oxidizing environment requires external heat sources to maintain the temperature of the reactor. However, coal has been dried in an oxidizing environment where the heat used to support the process is at least partially drawn from the burning coal. The temperature of the fluid bed reactor used to dry and otherwise process the coal is controlled by balancing the rate at which the coal is fed into the reactor against the amount of heat generated by the combustion process. Drying of coal increases the heating value of low rank coals, reduces the particle size of the feed stock, and partially decarboxylizes and desulfurizes the coal. After the coal is dried, it must be rehydrated to raise the moisture content up to about 5-9% to reduce its spontaneous combustion characteristics so that it is similar to native coal.

The table provided below illustrates the differences between raw coal and processed coal. One of skill in the art will appreciate that processed coal possesses a higher fixed carbon and heating values correspond to raw coal and the moisture content is drastically reduced.

|  | Raw Coal | Product 1 | Product 2 | Product 2 |
|---|---|---|---|---|
| Proximate Analysis: | | | | |
| Moisture | 20.16% | 8.00% | 8.00% | 8.00% |
| Ash | 8.16% | 7.93% | 8.69% | 8.67% |
| Volatile Matter | 31.70% | 35.33% | 34.90% | 35.05% |
| Fixed Carbon | 39.98% | 48.74% | 48.42% | 42.48% |
| Ultimate Analysis: | | | | |
| Moisture | 20.16% | 8.00% | 8.00% | 8.00% |
| Hydrogen | 2.87% | 3.32% | 3.19% | 3.14% |
| Carbon | 55.50% | 63.15% | 62.65% | 62.74% |
| Nitrogen | 0.75% | 0.99% | 1.12% | 0.81% |
| Sulfur | 0.77% | 0.52% | 0.54% | 0.48% |
| Oxygen | 11.79% | 16.09% | 15.82% | 16.16% |
| Ash | 8.16% | 7.93% | 8.69% | 8.67% |
| Heating Value, Btu/lb | 9,444 | 10,460 | 10,315 | 10,165 |

Fluidized bed processing of biomass has similar effect on the biomass product (biocoal). Further, for certain straw-like biomass, and possibly woody biomass residue, it is advantageous to pelletize biomass before torrefaction. Resulting torrefied product has bulk properties similar to that of coal, i.e., grinds easier and is easier to handle. Often, however, a binding agent, such as lignin, which also naturally occurs in the biomass, must be added to pulverized raw biomass so that pellets or briquettes (used in some instances interchangeable herein) can be formed. Often, pellets are formed in extrusion operation whereas briquettes are made in a pressing operation. The following patents and published patent applications describe raw biomass pelletizing processes of the prior art.

1) US 2008/0190015 A1—Describes that pellets can be formed from raw biomass on the basis of pressure with no regard to lignin content of the biomass.
2) U.S. Pat. No. 4,308,033—Describes grinding biomass to an unspecified size, drying the biomass to 13% moisture or less, adding a wax-water emulsion or a wax-lignin mixture to provide supplemental binder, adjusting the binder-biomass mixture moisture to approximately 28% moisture, and pelletizing the material in a conventional pellet press.
3) "Densification characteristics of corn cobs", N Kaliyan and R Morey—This study found that corn cobs at a moisture content of approximately 10% would form a good quality briquette/pellet at a temperature of approximately 85° C. (185° F.) and a pressure of 150 MPa (21,756 psi).
4) "Natural binders and solid bridge type binding mechanisms in briquettes and pellets made from corn stover and switchgrass", Bioresource Technology 101 (2010) 1082-1090, N. Kaliyan and R. Morey—This publication studied the binding mechanisms of natural binders found in corn stover and switch grass and found that natural binders softened at a temperature between 50° C. and 113° C. (122° F. and 235° F.). Moisture contents were in the range of 10% to 20%. Material tested was ground to corn stover particle size equal to about 0.34 mm and switch grass particle size equal to about 0.49 mm.
5) US 2009/0205546 A1—Describes that pellets can be made using a mixture of at least 75 weight percent cellulosic materials (biomass) and 5 to 15 weight percent thermoplastic polymeric materials. The temperature of the thermoplastic polymeric material may be raised to between 140° C. and 145° C. (284° F. and 293° F.) before or during mixing. The mixture is then pelletized and cooled. Thermoplastic polymeric materials are described as polyethylene, polypropylene, polyamide, polyimide, or combinations thereof
6) US 2010/0206499 A1—Describes the conversion of a pulp processing plant to a biomass based pellet manufacturing plant. The biomass feed is first processed by a convention pulp digester. This digester liberates the lignins present in the biomass. The pulp from the digester is then recombined with the liberated lignins and then pelletized. No pelletizing conditions are described.
7) "Feedstock and Process Variables Influencing Biomass Densification", Mark Shaw Master of Science Thesis—This document evaluated the affect of pressure and temperature on biomass pellet quality. Test work was completed using poplar wood and wheat straw and included various pressures between 31.6 and 126.3 MPa (4.6 and 18.3 psi) and temperature between 70 and 100° C. (158 and 212° F.). Moisture contents of the feed were 9 and 15%. This work also made an evaluation of the effect of pre-treating the biomass with steam expansion. A number of trends were indicated by this work but no definitive direction was offered on how to make a quality pellet. The overall conclusions are that 1) chemical composition of the feed stock did not have a large impact on compression/compaction, and 2) particle size and moisture content have more significant impact on compression and compaction than chemical composition.

Note that most these references are concerned with pelletizing raw biomass, and in some instances pulp, not torrefied biomass. More specifically, torrefaction significantly reduces the presence of hemicellulose compounds, to a lesser degree lignins, and thus torrefied biomass would be expected to pelletize differently than raw biomass or pulp and thus would be subjected to different pelletizing processes and requirements.

More specifically, attempts to pelletize torrefied biomass have revealed that a glassy surface forms on the exterior surface of the pellets when pelletization is performed in the range of about 121 to 135° C. (250-275° F.) as measured after the pellet was discharged from a Bliss pellet mill. Because in one test there was a one or two minute delay between pellet production and because the actual temperature conditions of the pellet press is higher than ambient, it is believed that pelletization temperature may have been higher. The glassy surface appears to be due to surface porosity sealing that imparts hydrophobicity to the pellet which enhances resistance to water degradation.

The pellets produced in one test were made from fines collected by a cyclone used in torrefaction process. The fines appear to be more evenly torrefied than the average processed biomass product consisting of larger particles. The fines were heated to approximately 135° C. (275° F.) and pressed into pellets. The resultant pellet appeared to be much denser than those observed in previous attempts to form pellets at lower temperatures. The pressed pellet did not have a glassy surface that was observed when the final torrefied biomass product was pelletized using ring-die pelletizing machine. No attempt was made to evaluate this pellet to determine its hydrophobic nature or resistance to water degradation, however. One of skill in the art will appreciate that pressed pellet does not have the same surface characteristics as the extruded pellet from a ring-die machine.

The work by others in an attempt to pelletize torrefied biomass appears to be under conditions similar to that used by traditional wood pellet processes, which typically restrict it to temperatures of about 65-93° C. (150-200° F.). However, under those conditions, the pellets are not hydrophobic and tend to degrade when exposed to moisture unless additional binders are added. As one of skill in the art will appreciate, adding binders adds additional production steps and costs.

SUMMARY OF THE INVENTION

It is one aspect of the present invention to process biomass by torrefaction. More specifically, torrefying biomass is an efficient way to achieve the goal of producing a biomass material that can be handled and burned like coal. Thus one embodiment of the present invention is a torrefaction process that is suited for biomass that reduces the moisture content, increases the heating value (HHV), and improves grindability and handling characteristics of the biomass. Hydrophobicity, shelf life, energy density, and homogeneity are all also improved. In addition, mass recovery of 55-65% of the feed as salable product is achieved. Further, energy recovery in the range of about 80-85% of the feed energy content of product is provided where nearly all sulphur is removed. In the process of one embodiment of the present invention, about 70% of the chlorine in the feed is also removed. One advantage to the contemplated process and related systems is that the processed biomass can be used in existing fossil fuel burning power plants alone or in combination with fossil fuels. That is, little or no modifications are needed to existing power producing systems or processes, and generating capacity was not decreased (derated).

It is another aspect of the present invention to employ a fluid bed reactor to torrefy the biomass. In one embodiment, the fluid bed reactor uses a combination of air and gas drawn from the fluid bed exhaust, i.e., "offgas" as a primary heating and fluidizing gas. The rate of fluidizing gas introduction into the fluid bed reactor would be as required to produce a gas velocity within the fluid bed reactor between about 4 and 8 feet per second. At this velocity, the bed temperature of the reactor would be maintained between about 230 to 350° C. (450 to 670° F.).

It is another aspect of the present invention to employ non fluidized bed reactors such as rotating drums, rotary kilns, cascaded whirling bed dryers, elongated slot dryers, hopper dryers, traveling bed dryers, vibrating fluidized bed dryers, vibrating screens, screw-based reactors and alike to torrefy the biomass. In such embodiments, the reactor uses a combination of air and gas drawn from the reactor exhaust, i.e., "offgas" as a primary heating and carrier gas for materials removed from the feed during torrefaction. The temperature of the reactor is maintained between about 230 and 350° C. (450 to 670° F.).

It is still yet another aspect of the present invention to torrefy biomass in the presence of oxygen. More specifically, as those skilled in the art are aware, torrefaction processes of biomass and coal, have generally been performed in an inert environment, usually in the presence of nitrogen, argon, water vapor, or some other inert or reducing gas. Those of skill in the art are also familiar with the fact that the rate at which volatiles associated with the feed stock are converted to vapor is a function of the amount of volatile organic and inorganic chemicals, processing temperature, and the residence time at the processing temperature. In general, reaction rates for volatile evolution, thermal cracking of larger organic compounds, and oxidation of the biomass increase with the increasing temperatures and increased residence time. However, because it takes time to dry the material before torrefaction reactions can occur, if the biomass is predried, preferably using heat from other sources in the system, residence times can be reduced.

Torrefying in an oxygen rich environment adds to the conversion of solid mass to gaseous mass and generates energy to drive the torrefaction process. The combustion of vaporized volatiles driven from the biomass generates heat to help maintain the torrefaction process. Traditionally, the heat associated with torrefaction predominately originates from outside sources. In contrast, the system of one embodiment of the present invention employs a fluid bed reactor that is heated internally by the burning of vapors from biomass and biomass itself. This reduces the amount of energy required from outside sources and allows the biomass to be "roasted" economically and in a controlled manner.

The primary reason that torrefaction processes of the prior art are performed in an inert environment is that burning of the biomass is believed to be uncontrollable and could lead to an explosion. Embodiments of the present invention, however, control the heat generation in the reactor to prevent excess combustion rates and possible explosion. Temperature control is achieved by controlling the amount of biomass feed and the amount of available oxygen to the reactor and one embodiment of the invention, combustion rate within the reactor is also controlled by selectively adding water to the reactor.

It is another aspect of the present invention of some embodiments of the present invention to use alternate forms of biomass, such as switch grass, agricultural waste, or sawdust, that are not suitable for processing in a fluid bed reactor. That is, normally unsuitable cellulosic biomass is first sized and shaped into a predetermined form to allow processing by the reactor. One method of performing this resizing is achieved by using an Andritz-Sprout pellet mill.

It is another aspect of the present invention to provide a torrefaction process that employs a rotary drum reactor. In one embodiment, the biomass flows countercurrent to the flow of reaction gas, e.g. recycled gas and air. The gas directed to the reactor must be sufficient to maintain the necessary oxygen level and so that volatile combustion rate proceeds at a rate to produce sufficient heat to torrefy the biomass without becoming uncontrolled.

It is another aspect to provide a scalable system. As traditional systems depend primarily on external heat sources, increase in reactor size translates to reduced external surface area to volume ratios, thereby requiring increased heat transfer rates or reduced capacity. As one skilled in the art will appreciate, in the case of a large reactor, external heating sources cannot efficiently raise the temperature of the inner portions of the larger reactors to heat the biomass efficiently.

The reactors of embodiments of the present invention, however, can be increased in size because the heat needed for torrefaction is internally generated. Ideally, a large reactor having an increased diameter is desired because it provides a bed with a large surface area to evenly expose the biomass to the heat.

It is still yet another aspect of the present invention to provide a process where pre-drying is used. As briefly mentioned above, biomass is often wet having a moisture content of about 10-50%. Thus to decrease residence time within the fluid bed reactor that is associated with vaporizing such moisture, some embodiments of the present invention pre-dry the feed stock. Pre-drying also increases the consistency of the feedstock which promotes consistent reactor operation. Pre-drying can be achieved by simply allowing the biomass to dry under ambient conditions. More preferably, however, a controlled pre-drying process is used wherein excess heat from the fluid bed reactor, or other processing stations of the system, is used to pre-dry the biomass.

It is still yet another aspect of the present invention to provide a process for starting combustion in the fluid bed reactor. More specifically, one embodiment of the present invention uses excess heat to initially start combustion of a predetermined amount of biomass positioned within the fluid bed reactor. After combustion has begun, the heat within the fluid bed reactor will increase due to the combustion of the biomass product. Once the temperature in the fluid bed reactor reaches a predetermined level, the amount of external heat added to the fluid bed reactor can be decreased and additional biomass is added to the reactor to maintain the temperature of the fluid bed reactor.

It is another aspect of the present invention to provide a new processing environment where torrefaction is performed at about 290° C. (550° F.) and wherein the biomass has a 15-20 minute residence time. One embodiment of the present invention has a minimum auto reaction temperature of about 260° C. (500° F.) and produces off gases of about 10 to 17 volume percent water vapor and about 4 to 5 volume percent carbon dioxide. The pressure in the fluid bed reactor is near atmospheric.

It is yet another aspect of the present invention to employ water sprays and a mixing device, such as a mixing screw or rotary drum, to cool the processed biomass. Hot torrefied product would be discharged directly from the reactor into the cooler and water would be sprayed onto the hot product through the use of a multiplicity of sprays to provide cooling through evaporation of water. The total amount of water added would be that to provide cooling to approximately the boiling point of water (100° C. at sea level) without raising the moisture content of the cooled product above approximately 3 weight percent. The mixing/tumbling action of the cooler would provide particle to particle contact to enhance distribution of the water added for cooling. The direct application of water may be achieved by methods disclosed in U.S. patent application Ser. No. 12/566,174, which is incorporated by reference in its entirety herein.

In an alternative embodiment of the present invention, an indirect cooler to reduce the temperature of the torrefied biomass is employed in the event that a minimum moisture content is required. For example, an indirect cooler with cooling surfaces such as a hollow flight screw cooler or a rotary tube cooler may be employed to achieve this goal.

It is another aspect of the present invention to provide a single stage process for biomass torrefaction, comprising charging biomass to a fluidized bed reactor, charging air to the fluidized bed reactor at a velocity of from about 4 to about 8 feet per second, subjecting the biomass to a temperature of from about 230 and 350° C. (450 to 670° F.), and removing the water from the biomass by torrefying the biomass. The biomass charged to the fluidized bed reactor of this embodiment has average moisture content from about 10 to about 50 percent. The reactor of this example may be comprised of a fluidized bed with a fluidized bed density up to about 50 pounds per cubic foot. In one contemplated process wood chips having a density of about 10 to 13 pounds per cubic foot are used. At fluidization, the bed density would be no more than half of the density of the feed stock. The biomass, such as agricultural waste, straw-like energy crops, etc., may be pelletized before feeding into the reactor. Pelletized feed would have bulk density of about 40 pounds per cubic foot so its bed density would be about 20 pounds per cubic foot.

It is another aspect of the present invention to provided a process for biomass torrefaction, comprising: adding biomass to a reactor; adding enriched gas to said reactor; controlling the oxygen content of the enriched gas; initiating heating of said biomass by increasing the temperature of said reactor; heating said biomass; maintaining said biomass within said reactor for a predetermined time; removing water from said biomass; vaporizing volatile organic compounds associated with said biomass; torrefying said biomass; and combusting said volatile organic compounds to help maintain the temperature of said fluidized bed reactor.

It is still yet another aspect of the present invention to provide a process for drying a material, comprising: directing the material to a reactor; pre-drying the material with gasses exhausted from the fluidized bed reactor; and subjecting said material within the reactor to a temperature sufficient to evaporate water; and combusting the vaporized organic compounds to provide heat needed to help maintain said temperature.

It is another aspect of the present invention to provide a torrefaction process that includes torrefaction of straw-like biomass by first pelletizing the biomass and then torrefying the pellets.

It is another aspect of the present invention to provide a torrefaction process that includes high pressure densification of the torrefied biomass into pellets or briquettes. More specifically, in one embodiment of the present invention, torrefied biomass is formed into a pellet using a pelletizing device wherein the pelletizing process is performed at about 90°-200° C. (194°-392° F.), and more preferably about 93°-177° C. (200°-351° F.). The unit density of pellets formed using this process is expected to be about 3-5 times greater than the density of the torrefied biomass prior to pelletization. Bulk density is increased by 2-4 times. The high pelletizing temperatures contemplated mobilize and redistribute lignins, i.e., natural binders still present in the torrefied biomass. As lignins and other natural binding agents are plentiful in non-processed biomass, pelletization can be performed at lower temperatures. In addition, the contemplated process is ideal for biomass materials that do not have sufficient natural binders which would form pellets with unacceptable hydrophobicity, regardless of the amount of heat provided during pelletization. In such cases, high heat environment will significantly reduce the amount of supplemental binder required.

It has been found that by pelletizing at a higher temperature, any remaining lignins in the torrefied biomass would become sufficiently plastic so as to produce a suitably hydrophobic pellet with minimal or no supplemental binder required. The higher pelletizing temperatures also increase plasticity and reactivity, which promote the creation of a coating on the outside of the pellet that helps the pellet resist the effect of the moisture. Further, if any binders are added when the biomass is processed at these high temperatures, the resultant pellets have improved mechanical properties and resist degradation when exposed to moisture because the binders are used more efficiently. One of skill in the art will appreciate that lignins, which are sometimes characterized as thermoplastic materials experience lower viscosity as temperature increases.

Further, although it is desirable to avoid using a binder, one of skill in the art will appreciate that binders may be used to 1) improve the mechanical strength of the pellet; 2) provide lubrication to control press temperature and to enable high throughput; 3) increase polymerization reactions of natural binders present in the biomass; 4) improve hydrophobic properties; 5) modify thermoplasticity of natural binders; and 6) modify ash melting temperature of constituents such as alkali metals present in the biomass.

In one embodiment, the high pelletizing temperatures are obtained by maintaining the temperature of the torrefied biomass discharged from the reactor. To accommodate such high temperature pelletization, close coupling of pelletizing equipment and reactor inconjunction with equipment insulation and/or jacketed transfer equipment with suitable heating fluid circulation may be required. In addition to, or instead of, not letting the torrefied biomass to cool, the torrefied biomass may be reheated before or during the pelletization process. One of skill in the art will appreciate that reheating the torrefied biomass may be accomplished using jacketed equipment with suitable heating fluid circulating in the jacket and/or heat taken from frictional forces present within the press. Alternatively, the heat may be provided by exposure with hot fluid gas, e.g., on a belt dryer or storage bin that is operated as a down draft fixed bed. Further, a combination of heating or heat conservation techniques may be used.

Traditional wood pelletizing operations avoid high temperatures by increasing the moisture content of the biomass or using jacketed press equipment that cools the press dye to a controlled temperature so as to avoid the onset of biomass devolitization at temperatures above, for example, about 130° C. As embodiments of the present invention are concerned with torrefied biomass, devolitization is not an issue. The heating approach used by embodiments of the present invention may also depend on press design parameters, so one specific heating approach may not be suitable for all press designs. After forming the high temperature pellets, the pellets would be cooled to provide pellet strength for bulk storage and loadout.

It is another aspect of the present invention to provide a torrefied biomass pellet having a coating. In one embodiment, the pellets are generally cylindrical with a diameter of about 0.25 inches with varying length.

It is another embodiment of the present invention to use an inexpensive additive such as coal to pelletize torrefied biomass. Just like lignins in the biomass, tars present in the coal act as a binder.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 4 is a table showing wood biomass data;

FIG. 5 is a table showing bio-coal data; and

Figure 1:
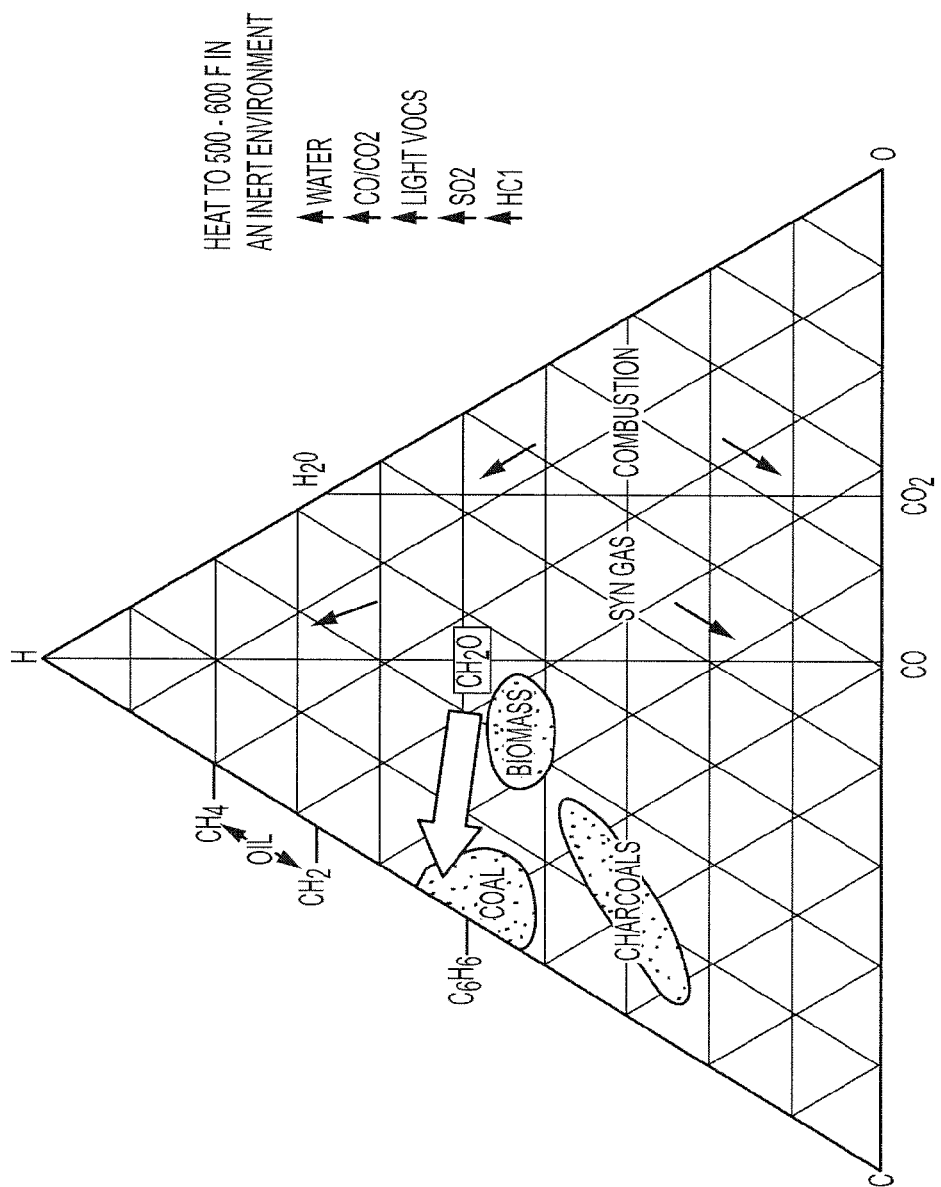
FIG. 1 is a schematic representation showing the relationship between biomass, coal, and charcoal torrefaction.

To assist in the understanding of one embodiment of the present invention, the following list of components and associated numbering found in the drawings is provided below:

COMPONENT

2 Biomass torrefaction system
6 Fluid bed reactor
10 Hopper
14 Conveyor
18 Surge bin
22 Feeder
26 Feed screw
34 Plate
46 Off gas
50 Startup heater combustion air fan
54 Recycle fan
58 Recycle Gas line
62 Recycle Gas line
66 Recycle Gas line
70 Heated Fluidizing Gas line
74 Heated Fluidizing Gas line
78 Heated Fluidizing Gas line
82 Offgas line
86 Recycled Gas line
90 Recycled Gas line
94 Fresh air fan
98 Valve
102 Emissions control device
106 Particulate removable device
110 Startup heating system
114 Valve
118 Cooler
122 Dump valve
126 Conveyor
130 Storage system
140 Grinder
144 Pelletizer/Briquetter
146 Pellet Cooler
150 Pellet Cooling Fan It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIG. 1 is a schematic representation showing the relationship between biomass, coal, and charcoal. It is one goal of embodiments of the present invention to provide a system and process suited for altering biomass, regardless of its source, such that it behaves like coal. One advantage of providing biomass that behaves like coal is that existing coal burning electrical power plants can use the processed biomass without substantial modifications. To make biomass a viable alternative, moisture content must be reduced, heating value must be increased, grindability and handling must be improved, hydrophobicity must be imparted, shelf life must be increased, energy density must be increased, and homogeneity must be improved. To achieve these objectives, embodiments of the present invention treat biomass by torrefaction wherein water, light volatile organic chemicals, sulfur, and chlorine are driven out of the raw biomass. The end result is a coal like product that can be used in coal burning electricity generation plants of current design.

More specifically, the torrefaction contemplated by embodiments of the present invention include thermally processing biomass at temperatures of about 250-325° C. (480-620° F.) under near atmospheric pressure and in the presence of oxygen. This process will remove water and light volatiles from biomass and will reduce the oxygen content of the biomass. Importantly, the amount of fixed carbon in the biomass is increased and the biopolymers, hemicelluloses, and some lignin, are decomposed.

Figure 2:
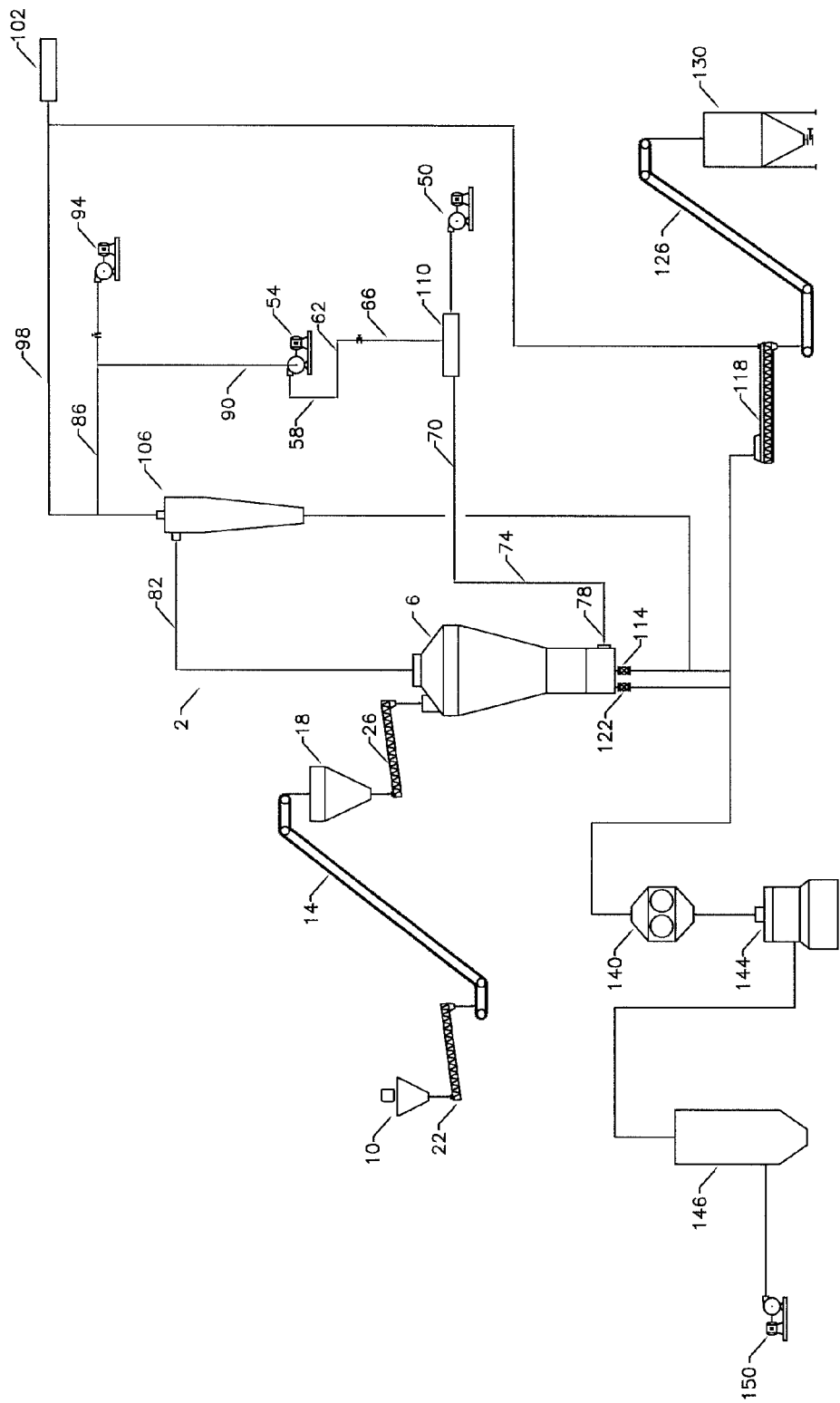
FIG. 2 is a schematic of a biomass torrefaction process of one embodiment of the present invention.

Referring now to FIG. 2, the biomass torrefaction system 2 of one embodiment of the present invention employs a fluidized bed reactor 6. The biomass may be wood that has been reduced in size by a commercially available wood chipper. The biomass may also be pelletized to improve its size, shape, and/or bulk density. The size of the biomass will vary, but the smallest dimension is typically about 3 mm to 10 mm. Although wood is mentioned here, one of skill in the art will appreciate that straw or other agricultural waste may be used without departing from the scope of the invention. In one embodiment, biomass having about 10 to 50 weight percent moisture is processed. The biomass is initially fed into a hopper 10 that in one embodiment is a feed hopper equipped with a screw conveyor or paddle screw feeder that is adapted to controllably feed biomass to a feed conveyor 14. In another embodiment, the biomass is fed directly into a surge bin 18.

A feeder 22 positioned beneath the feed hopper 10 empties biomass onto the conveyor 14. In one embodiment, the feed conveyor 14 provides up to 6000 pounds (2721.6 kg) of biomass per hour to the surge bin 18. The surge bin 18 is equipped with a controllable feed screw 26 that supplies the desired amount of feed at the desired rate to the fluid bed reactor 6. In another embodiment, a rotary valve or lock hoppers may be used if the surge bin is located above the reactor 6. In one embodiment, the surge bin 18 employs low level and high level sensors that automatically control a rotary valve and/or associated feeder 22 located underneath the feed hopper 10 in order to maintain a predetermined amount of feed biomass in the surge bin 18. In another embodiment, the level of biomass in the surge bin 18 is controlled using a continuous level sensor such as, e.g., an ultrasonic level sensing unit. A feed screw 26 directs biomass to the fluid bed reactor 6. The fluid bed reactor 6 may be a custom design or a commercially available design.

The biomass can be dried to a moisture content of less than about 20 weight percent before introduction to the reactor 6. The biomass may be pre-dried by conventional means including, e.g., air drying, rotary kilns, cascaded whirling bed dryers, elongated slot dryers, hopper dryers, traveling bed dryers, vibrating fluidized bed dryers, and other methods that do not employ a fluidized bed reactor. Those of skill in the art will appreciate that fluidized-bed dryers or reactors may also be used. The heat source for pre-drying the biomass may be of the form of waste heat, other available heat sources, or auxiliary fuels. The waste heat may be drawn from the reactor 6 or an emissions control device 102. In one embodiment, the biomass is pre-dried to a moisture content of about 5 to about 20 weight percent. In another embodiment, two or more biomass materials, each with different moisture contents, are blended together to provide a raw feed with an average moisture content of less than about 40 weight percent that may also have been pelletized before processing.

Figure 3:
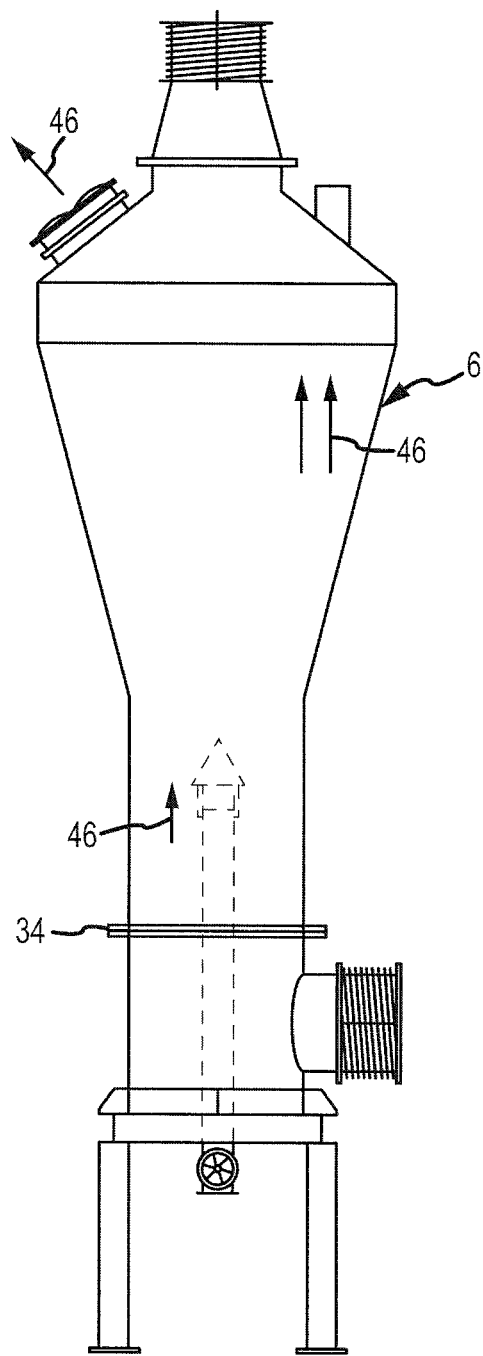
FIG. 3 is a detailed view of FIG. 2 showing a fluid bed reactor used in the process of one embodiment of the present invention.

FIG. 3 is a schematic of an integrated fluid bed reactor 6 and pre-dryer system of one embodiment of the invention. Off-gases 46 from the fluidized bed 6 are recycled and re-enter the fluid bed below plate 34. The fluidized bed reactor 6 is cylindrical and has an aspect ratio (bed height divided by diameter) of about 2 or less, in one embodiment, the aspect ratio ranges from about 2 to about ⅓. Non-cylindrical fluidized beds also may be used, but in one embodiment, the aspect ratio thereof (the ratio of the bed height to the maximum cross sectional dimension) ranges from about 2 to about ⅓. Bed fluidization is achieved by directing fluidizing gas through the perforated plate 34. A mixture of fresh air and recycled gas, i.e., gas taken from the fluidized bed reactor 6, is used as the fluidizing gas. It is preferred to use a blower to control the amount and composition of the fluidizing gas. In other embodiments, multiple blowers may be used or flow control devices.

A startup heater system 110 is used to provide the heat needed for preheating the fluidizing gas during startup and for flame stabilization during normal operation. In addition, a recycle fan 54 is used to move the fluidized gas in a loop comprised of lines 58, 62, 66, 70, 74, 78, 82, 86 and 90 during startup and shutdown of the system.

A fresh air fan 94 or the burner fan 50 is used to add fresh air to the fluidizing gas in order to adjust the oxygen content thereof. In another embodiment, the fan 94 may be replaced with a control valve and a suitable control valve added to line 86. During startup and shutdown, as fresh air is added to the fluidizing gas, a vent valve 98 is used to release an equal amount of gas to the emissions control device 102 to maintain a consistent flow of fluidizing gas through the reactor 6.

Gases exiting the reactor 6 enter a particulate removal device 106 where fines are separated. Multiple fines removal devices may be employed to allow coarser particulate to be recovered as additional product or as a separate product. Cleaned gas passes a vent valve 98 where an appropriate amount of gas is vented to an emissions control device 102. The purpose of the emissions control device 102 is to destroy any carbonaceous components in the offgas after removal of particulate. The emissions control device could be, e.g., a thermal oxidizer. Alternatively, the emissions control device could be, e.g., a catalytic oxidizer. Extra fuel may be added to the venting gas to raise the temperature thereof. The gas exiting the emissions control device would be a source of waste heat for drying the feed in the pre-dryer (not shown).

In one embodiment, a typical startup procedure involves, e.g., starting the heater system 110 and the recycle fan 54. Recycle fan speed is selected to ensure sufficient gas flow to achieve bed fluidization, preferably the apparent gas velocity in the reactor is in the range of about 4 to 8 feet per second. The temperature of the fluidizing gas is slowly increased using the heater system. When the biomass in the reactor 6 reaches a temperature within the range of about 446 to 482° F. (230 to 250° C.), biomass is fed to the reactor to fill the reactor bed. When the biomass reaches a temperature of approximately 250° C. (480° F.), it begins to release heat as it consumes oxygen present in the fluidizing gas. Small amounts of biomass are then added to the reactor 6 to maintain a steady rise in the temperature of the fluidized bed. It is preferred that the temperature of the fluidized bed be maintained at about 230 and 350° C. (450 to 670° F.) and, more preferably, about 270 to about 300° C. (520 to about 570° F.).

As biomass is processed it exits reactor 6 through valve 114 into a cooler 118. A dump valve 122 can be used to remove material buildup in the bed, or in case of emergency, be actuated to quickly empty the reactor 6 contents into the cooler 118. As the process reaches steady state, the temperature of the recycle gas in line 66 increases and the burner system 110 controls automatically reduces the firing rate. In one embodiment, hot gasses taken from the emissions control device 106 are used to preheat the fluidizing gas (for example, by the process of FIG. 3) to reduce the amount of combustion of biomass required to maintain the temperature of the fluidized bed as well as the amount of fuel required by the burner system 110. The reactor 6 is preferably equipped with several water spray nozzles (not shown) to assist in the control the temperature of the fluidized bed. The reactor 6 is also preferably equipped with several temperature sensors to monitor the temperature of the fluidized bed.

At steady state, reactor 6 operation is a balance between biomass particle size, the reactor temperature, the residence time required for decomposition of biomass polymers, the residence time required for moisture to diffuse from the interior of the biomass particles, the reaction rate of oxygen with the volatile organics, and the gas velocity required for maintaining proper levels of fluidization. In one embodiment, the smallest biomass particle dimension is from about 3 mm to about 10 mm, the fluidizing gas velocity is from about 4 to about 8 feet per second, the temperature of the fluidized bed is maintained at about 230 and 350° C. (450 to 670° F.) and, more preferably, at about 270 to about 300 degrees ° C. (520 to about 570° F.), and the average biomass particle residence time is from about 5 minutes to about 30 minutes.

The gases leaving the reactor 6 via line 82 have an oxygen content of less than about 8 volume percent, whereas the oxygen content of the fluidizing gas is maintained at about 10 to 14 volume percent to maximize the rate of biomass processing. At the preferred steady state conditions, the amount of heat released via the combustion of the biomass is balanced by the amount of heat required to accomplish torrefaction and dry the biomass added to the reactor 6.

The off gas from reactor 6 is run through a particle separation step to remove particles entrained in the reactor offgas. In one embodiment, this step consists of a single unit such as a cyclone 106. In another embodiment, the particle separation step includes multiple devices to facilitate recovery of entrained particles on the basis of particle size or density. Larger particles may be directed to the reactor discharge for recovery as product.

The biomass produced in reactor 6 is typically at a temperature of about 275 to about 330 degrees Centigrade, and it typically contains about 0 to about 1 weight percent of moisture. This product is discharged through valve 114 which may be, e.g., a rotary valve, lock hoppers, etc. to a cooling apparatus 118.

In one embodiment, the torrefied biomass could be used at locations near the production site. In this embodiment, the torrefied biomass would need to be cooled below its combustion temperature. The preferred method for cooling occurs in one process piece of process equipment. This could be a screw conveyor, a mixing screw conveyor, a rotary drum, rotary tube cooler or any other device that would provide cooling through heat losses to ambient or the application of water. The cooler 118 would be equipped with a multiplicity of water sprays and temperature sensors to allow water to be applied to the product for either progressively lowering the temperature of the product to less than about 100 degrees Centigrade at sea level and/or adding up to about 3 percent moisture to the product. The application of water may be continuous or intermittent. The control of water application could be on the basis of temperature, the mass flow rate of product and/or a combination thereof.

In one embodiment, the cooling device would be a mixing screw. In another embodiment, the cooling device could be a hollow flight screw cooler. The screw cooler assembly is also comprised of a multiplicity of water sprays and temperature sensors to control the application of water on the basis of product temperature. For example, if the rate of temperature decrease in the cooler is too high, the rate may be modified by modifying the biomass feed rate into the system, and/or by modifying flow rate or temperature of the water in the screw jackets and/or the rate at which water is applied using the sprays. The water spray may be continuous, and/or it may be intermittent.

The cooled biomass from cooler 118 is discharged 70 to a conveyor 126. The conveyor 126 conveys the cooled biomass product to a storage system 130, a load out system for trucks or railcars (not shown), or directly to the end user. Any gases emitted in the cooler are directed to the emissions control device 106.

In another embodiment of the present invention the torrefied biomass discharged from the reactor is densified to facilitate long distance transport and/or long term storage. To facilitate densification, the torrefied biomass is not cooled which maximizes the effectiveness of residual binders in the torrefied biomass. The densification equipment would be well insulated and close coupled to the reactor discharge to avoid excessive heat loss. In another embodiment the densification equipment would be heated using jacked equipment.

The torrefied biomass discharged is directed to a grinder 140, which may be any number of devices such as a jaw crusher, roller mill, or hammer mill. Selection of the grinder would be a function of the requirements of the densification device 144. The densification device of one embodiment of the present invention is a pellet mill such as that produced by various vendors such as Andritz-Sprout, Bliss Industries, or Amandus Kahl that is modified to operate at temperatures in the range of about 90° C. to about 200° C. In another embodiment, the densification device is a roll press similar to that produced by Komarek. In yet another embodiment, the densification device is comprised of emerging press technology such as that being developed by Kanvironmental. Both of these latter contemplated embodiments would require operation in the range of about 90° C. to about 200° C.

In another embodiment, supplemental binders are added before densification. For example, the binder may be at least one of unprocessed lignin, lingo-sulfonate, coal, bitumen, molasses, or raw biomass. These binders are added to the ground torrefied biomass in a mixer (not shown) such as a pug mill, ribbon blender, static mixer, or mixing screw.

After densification, the pellets or briquettes are cooled to provide strength for subsequent handling, storage, and transport. The cooling device 146 would cool the pellets (or briquettes) to a temperature of about 50° C. The cooling device would directly contact the pellets with air or an inert gas through the use of an external fan 150. The cooling step may also include a gas cooling system (not shown) to facilitate the recycle of the cooling medium or to enhance the functionality of the cooling step.

Referring now to FIG. 4 shows a Proximate and Ultimate analysis for an example woody biomass feed. FIG. 5 shows a Proximate and Ultimate analysis for the torrefied product produced from the woody biomass feed of FIG. 4.

Figure 6:
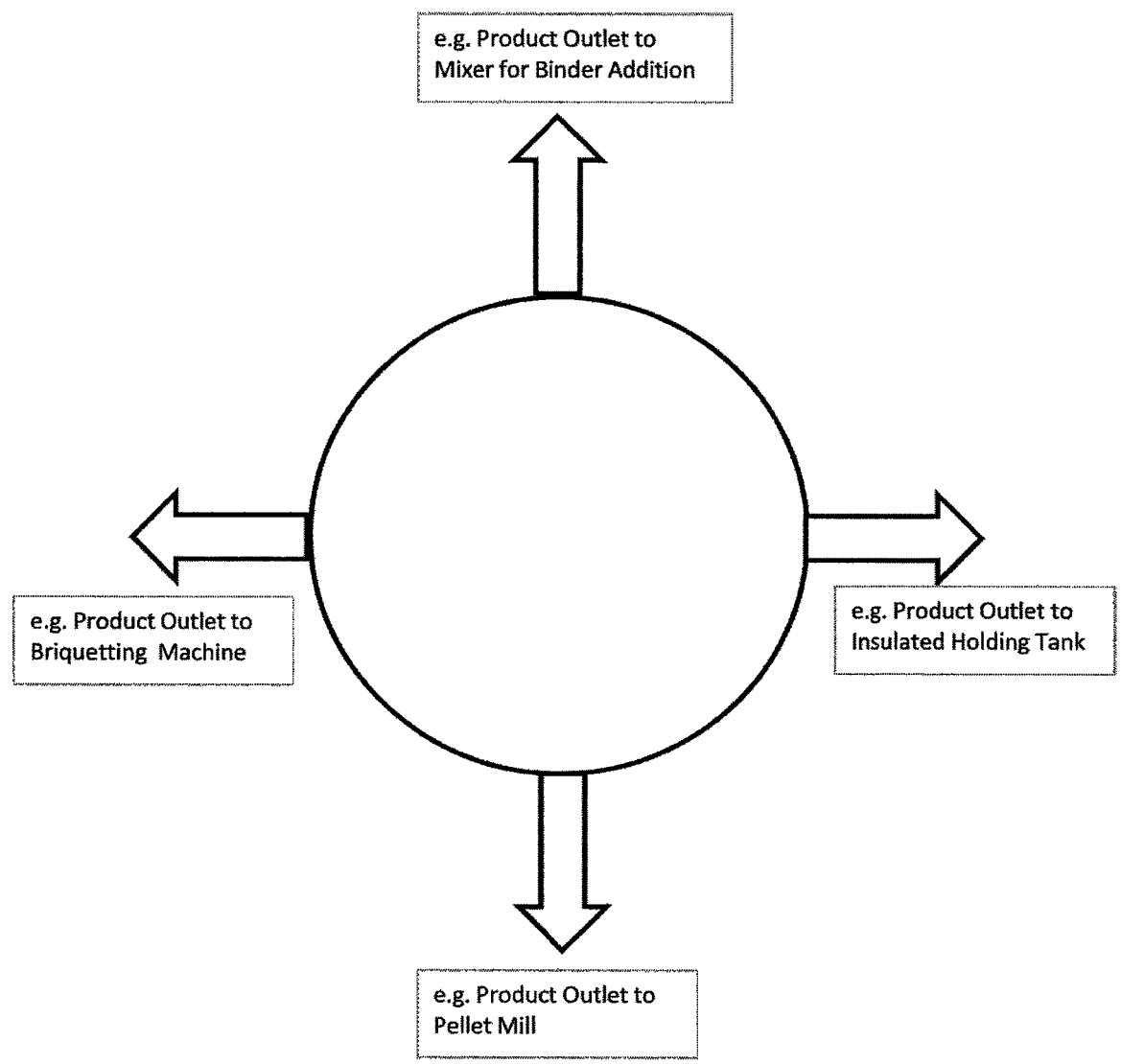
FIG. 6 is a schematic showing torrefied biomass processing options.

FIG. 6 represents four processing path options for the reactor product, i.e., the torrefied biomass. The right arrow represents directing the torrefied biomass to an insulated holding tank where it would be then directed to the grinding and pelletizing operation. In this option, supplemental heating of the material would be required to keep the material at the desired pelletizing temperature. The down arrow represents directing the torrefied biomass directly to the grinding and pelletizing operation. As there is the potential of heat loss to the environment during grinding, supplemental heating of the grinding equipment may be required to keep the product at the desired pelletizing temperature. The left arrow represents directing the torrefied biomass to a briquetting machine. If it is necessary to grind the reactor product before briquetting, supplemental heat may also be required to maintain the temperature of the product. The up arrow represents directing the torrefied biomass to a mixing operation where supplemental binders could be added. After the addition of the binder, the discharge from this operation would be re-directed to one of the first three processing steps described above.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A process for biomass torrefaction, comprising:
    adding biomass to a reactor;
    adding a first gas to said reactor, wherein the first gas comprises an oxygen concentration from about 10 vol % to about 21 vol %;
    controlling an oxygen concentration of a second gas exiting said reactor, wherein said oxygen concentration of the second gas is less than about 8 vol %;
    initiating heating of said biomass by increasing a temperature of said reactor;
    heating said biomass to a biomass temperature between about 250° C. to about 325° C. by partial combustion of said biomass with oxygen in the first gas in said reactor;
    maintaining the biomass temperature within said reactor for a predetermined time by spraying water into said reactor, whereby a portion of moisture is removed from said biomass, volatile organic compounds associated with said biomass are removed, and said biomass is torrefied to produce a torrefied biomass with a moisture content from about 0 wt % to about 2 wt %; and
    increasing the density of said torrefied biomass at a temperature of about 90° C. to 200° C. to form a densified biomass.

2. The process of claim 1, wherein said densified biomass is hydrophobic.

3. The process of claim 1, wherein said densified biomass has a glassy surface.

4. The process of claim 1, wherein said densified biomass contains a distribution of lignins.

5. The process of claim 1, wherein said densified biomass possesses a coating.

6. The process of claim 1, wherein said densified biomass is in the form of pellets or briquettes.

7. The process of claim 6, wherein the pellets have a maximum size of about 1.5 in.×1.5 in.×0.4 in.

8. The process of claim 1, wherein binders are not added to the torrefied biomass.

9. The process of claim 1, further comprising adding a binder to the torrefied biomass.

10. The process of claim 1, further comprising feeding said torrefied biomass directly to a densification device, wherein the temperature of the torrefied biomass is maintained.

11. The process of claim 1, wherein a temperature of the reactor is between about 270° C. and about 300° C.

12. The process of claim 1, wherein said biomass has an average moisture content from about 10% to about 50%.

13. The process of claim 1, further comprising coating the densified biomass.

14. The process of claim 1, wherein the densified biomass has a diameter of about 0.25 inches.

15. The process of claim 1, further comprising combining a binder with the torrefied biomass in a mixer prior to the densification step, and wherein the binder is at least one of an unprocessed lignin, a ligno-sulfonate, a coal, a bitumen, a molasses, or a raw biomass.

16. The process of claim 1, further comprising grinding the torrefied biomass before the densification step.

17. The process of claim 16, wherein the grinding step occurs at a temperature between about 90° C. and about 200° C.

18. The process of claim 1, further comprising cooling the densified biomass to a temperature of about 50° C.

19. The process of claim 1, wherein said biomass is selected from the group consisting of wood, forestry waste, energy crops, municipal waste, plant material, straw, agricultural waste, and combinations thereof.

* * * * *